US012623586B2

(12) United States Patent
Kataoka et al.

(10) Patent No.: US 12,623,586 B2
(45) Date of Patent: May 12, 2026

(54) LIGHT DISTRIBUTION CONTROLLING DEVICE, VEHICLE LAMP SYSTEM, AND LIGHT DISTRIBUTION CONTROLLING METHOD

(71) Applicant: Koito Manufacturing Co., Ltd., Tokyo (JP)

(72) Inventors: Takuya Kataoka, Shizuoka (JP); Hiroki Sumitani, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 67 days.

(21) Appl. No.: 18/827,925

(22) Filed: Sep. 9, 2024

(65) Prior Publication Data

US 2025/0001927 A1 Jan. 2, 2025

Related U.S. Application Data

(63) Continuation of application No. PCT/JP2023/007653, filed on Mar. 1, 2023.

(30) Foreign Application Priority Data

Mar. 25, 2022 (JP) ................................. 2022-050591

(51) Int. Cl.
B60Q 1/08 (2006.01)
(52) U.S. Cl.
CPC ............ B60Q 1/08 (2013.01); B60Q 2300/42 (2013.01)
(58) Field of Classification Search
CPC ........... F21V 14/04; F21V 7/00; B60Q 1/143; B60Q 1/08; B60Q 2300/41; B60Q 2300/056; B60Q 2300/42
See application file for complete search history.

(56) References Cited

U.S. PATENT DOCUMENTS

2015/0085514 A1* 3/2015 Yagi ........................ F21S 41/16
362/538
2022/0227285 A1 7/2022 Arai et al.
(Continued)

FOREIGN PATENT DOCUMENTS

DE 102016014330 B3 * 4/2018 ............. B60Q 11/00
JP 2005203845 A 7/2005
(Continued)

OTHER PUBLICATIONS

International Preliminary Report on Patentability (Form PCT/IB/373) and the Written Opinion of the International Searching Authority (Form PCT/ISA/237) issued on Sep. 24, 2024, by the International Bureau of WIPO in corresponding International Application No. PCT/JP2023/007653. (8 pages).

(Continued)

*Primary Examiner* — Patrick C Chen
(74) *Attorney, Agent, or Firm* — BUCHANAN, INGERSOLL & ROONEY PC

(57) ABSTRACT

A light distribution controlling device generates a processed image by adding a pixel line of a luminance value higher than a predetermined threshold to an end, in a width direction of a vehicle, of an image that is based on a first imaging device; extracts, from the processed image, a processing region that includes a front vehicle; generates an extracted image by subjecting the processing region to an extracting process of extracting a high-luminance pixel with use of the threshold; and sets a shaded portion to overlap the front vehicle based on a pair of high-luminance pixels included in the extracted image and determines a light distribution pattern that includes the shaded portion.

11 Claims, 7 Drawing Sheets

(56)  References Cited

U.S. PATENT DOCUMENTS

| 2022/0289101 | A1 | 9/2022 | Iriba |
| 2023/0019153 | A1 | 1/2023 | Maruyama et al. |
| 2023/0088603 | A1 | 3/2023 | Kataoka |

FOREIGN PATENT DOCUMENTS

| JP | 2015064964 A | 4/2015 | | |
| JP | 2021024495 A | 2/2021 | | |
| WO | 2021/070783 A1 | 4/2021 | | |
| WO | WO-2021112094 A1 * | 6/2021 | ............ | H04N 23/74 |
| WO | WO-2021193702 A1 * | 9/2021 | ............ | F21S 41/148 |
| WO | 2021/251371 A1 | 12/2021 | | |

OTHER PUBLICATIONS

International Search Report (Form PCT/ISA/210) issued on May 9, 2023, by the Japanese Patent Office in corresponding International Application No. PCT/JP2023/007653. (6 pages).
Extended European Search Report issued on Mar. 3, 2025, in corresponding European Patent Application No. 23774415.6. (8 pages).

* cited by examiner

FIG. 3A                    FIG. 3D
FIG. 3B                    FIG. 3E
FIG. 3C                    FIG. 3F
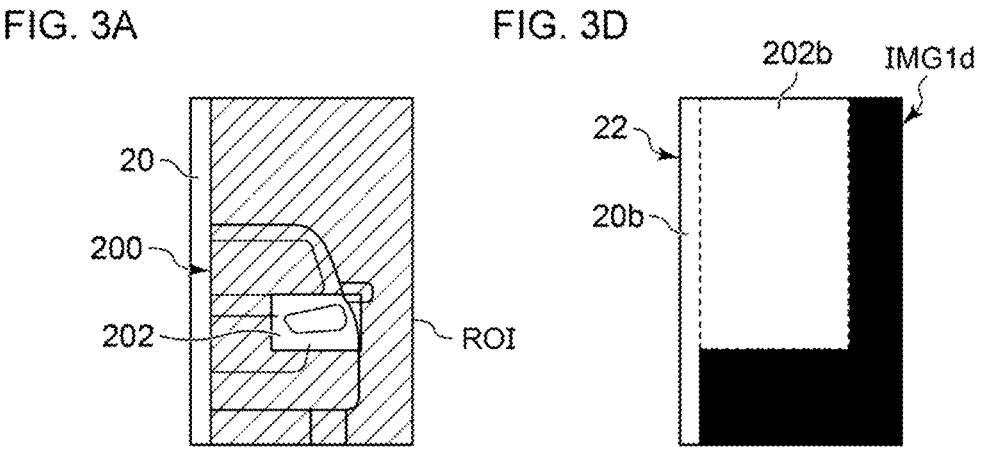
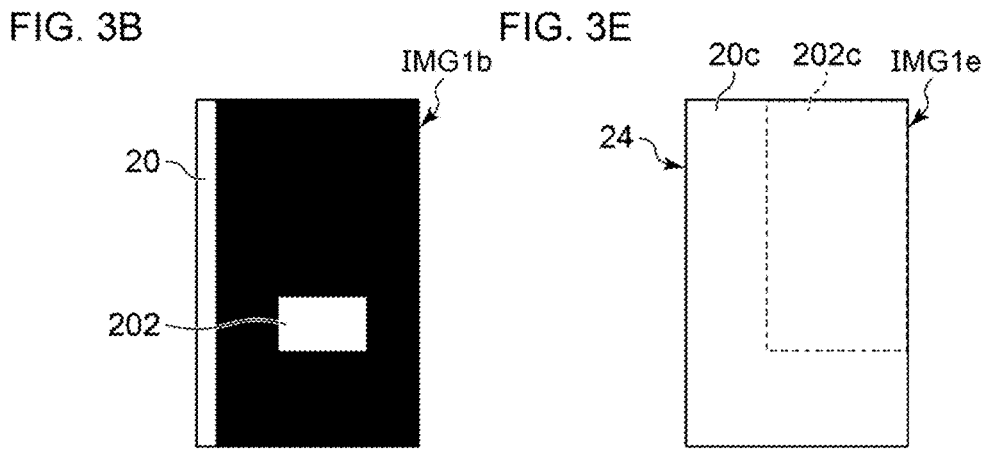
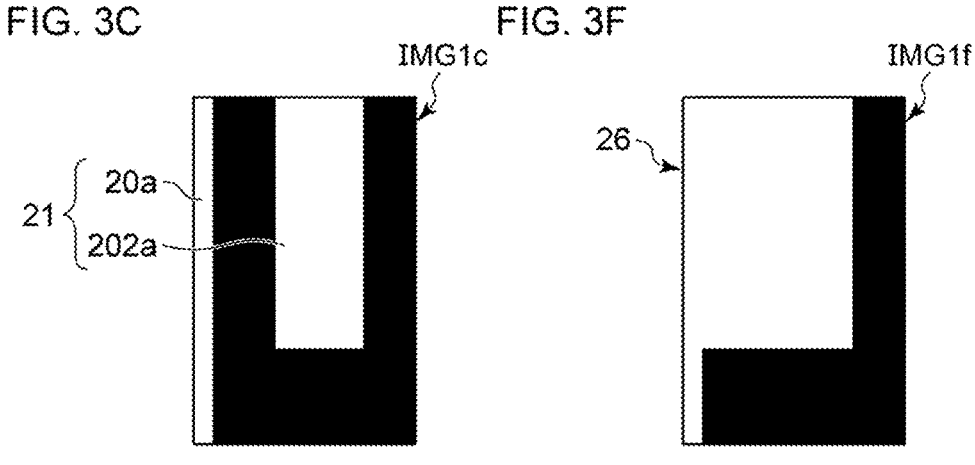

LIGHT DISTRIBUTION CONTROLLING DEVICE, VEHICLE LAMP SYSTEM, AND LIGHT DISTRIBUTION CONTROLLING METHOD

CROSS-REFERENCE TO RELATED APPLICATIONS

This application is the continuation of International Patent Application No. PCT/JP2023/007653, filed on Mar. 1, 2023, which claims the benefit of priority from Japanese Patent Application No. 2022-050591, filed on Mar. 25, 2022, the entire content of each of which is incorporated herein by reference.

BACKGROUND

Field of the Invention

The present invention relates to light distribution controlling devices, vehicle lamp systems, and light distribution controlling methods.

Description of the Related Art

Adaptive driving beam (ADB) control is being proposed that dynamically and adaptively controls light distribution patterns based on the circumstances surrounding the vehicle. ADB control detects, with a camera, the presence of a front vehicle that should not be illuminated with high-luminance light and blocks the region of the light that corresponds to the front vehicle (see, for example, Patent Literature 1). Blocking the region of the light that corresponds to the front vehicle can reduce glare caused on the driver of the front vehicle and can also improve the visibility for the driver of the host vehicle.

Patent Literature 1: JP 2015-064964

When ADB control is implemented, it is desired that there be no failure to form a shaded portion.

SUMMARY OF THE INVENTION

The present invention has been made in view of such circumstances and is directed, in one aspect, to providing a technology that increases reliability in forming a shaded portion.

To address the problem above, one aspect of the present invention provides a light distribution controlling device. This light distribution controlling device is configured to generate a processed image by adding a pixel line of a luminance value higher than a predetermined threshold to an end, in a width direction of a vehicle, of an image that is based on a first imaging device that captures an image of a region ahead of the vehicle; extract, from the processed image, a processing region that includes a front vehicle; generate an extracted image by subjecting the processing region to an extracting process of extracting a high-luminance pixel with use of the threshold; and set a shaded portion to overlap the front vehicle based on a pair of high-luminance pixels included in the extracted image and determine a light distribution pattern that includes the shaded portion.

Another aspect of the present invention provides a vehicle lamp system. This vehicle lamp system includes a light distribution variable lamp capable of forming a light distribution pattern that includes a shaded portion to overlap a front vehicle, a first imaging device that captures an image of a region ahead of a vehicle, and the light distribution controlling device according to the aspect above that controls formation of the light distribution pattern by the light distribution variable lamp.

Another aspect of the present invention provides a light distribution controlling method. This light distribution controlling method includes generating a processed image by adding a pixel line of a luminance value higher than a predetermined threshold to an end, in a width direction of a vehicle, of an image that is based on a first imaging device that captures an image of a region ahead of the vehicle; extracting, from the processed image, a processing region that includes a front vehicle; generating an extracted image by subjecting the processing region to an extracting process of extracting a high-luminance pixel with use of the threshold; and setting a shaded portion to overlap the front vehicle based on a pair of high-luminance pixels included in the extracted image and determining a light distribution pattern that includes the shaded portion.

It is to be noted that any combinations of the constituent elements above or an embodiment obtained by converting what is expressed by the present invention between a method, an apparatus, a system, and so forth is also valid as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 3A to 3F are illustrations for describing an operation of a light distribution controlling device according to Embodiment 1;

DETAILED DESCRIPTION OF THE INVENTION

Figure 1:
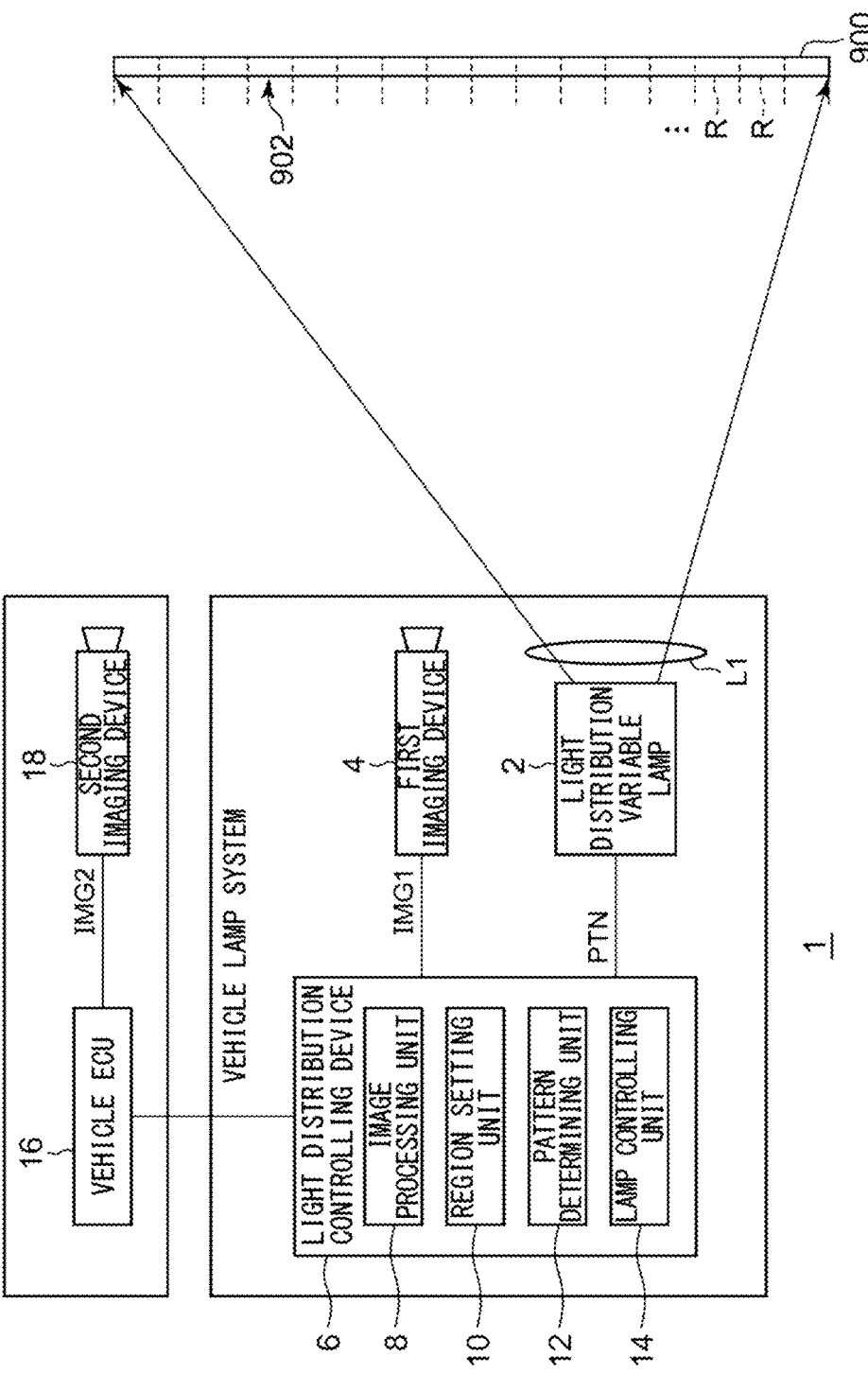
FIG. 1 is a block diagram of a vehicle lamp system.

Hereinafter, the present invention will be described based on some exemplary embodiments and with reference to the drawings. The embodiments are illustrative in nature and are not intended to limit the invention. Not all the features and combinations thereof described in the embodiments are necessarily essential to the invention. Identical or equivalent constituent elements, members, and processes shown in the drawings are given identical reference characters, and their duplicate description will be omitted, as appropriate.

The scales and shapes of the components shown in the drawings are set merely for convenience in order to facilitate the description and are not to be interpreted as limiting, unless specifically indicated otherwise. When terms such as "first" and "second" are used in the present specification or in the claims, these terms do not indicate the order or the level of importance in any way and are merely used to distinguish a given component from another component, unless specifically indicated otherwise. Members that are not important in describing the embodiments are partly omitted from the drawings.

Embodiment 1

FIG. 1 is a block diagram of a vehicle lamp system 1. FIG. 1 depicts constituent elements of the vehicle lamp system 1 in the form of functional blocks. These functional blocks are implemented, in terms of their hardware configuration, by elements and/or circuits, such as a CPU and a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, a first imaging device 4, and a light distribution controlling device 6. These components are provided in a vehicle. According to the present embodiment, the vehicle in which the vehicle lamp system 1 is provided is a straddle-type vehicle, such as a motorcycle. The light distribution variable lamp 2, the first imaging device 4, and the light distribution controlling device 6 may all be contained within a single housing, or some of these members may be provided outside such a housing. For example, the light distribution variable lamp 2, the first imaging device 4, and the light distribution controlling device 6 are housed in a lamp room. The lamp room is defined by a lamp body having an opening that opens to the front of the vehicle and a light-transmissive cover attached so as to cover the opening of the lamp body. The first imaging device 4 and the light distribution controlling device 6 may be provided outside the lamp room. In this case, the first imaging device 4 may be an onboard camera. The light distribution controlling device 6 may be, for example, entirely or partly embedded in a vehicle ECU 16.

The light distribution variable lamp 2 is capable of forming a light distribution pattern PTN that includes a shaded portion to overlap a front vehicle. For example, the light distribution variable lamp 2 illuminates a region ahead of the host vehicle with a visible light beam L1 of a variable intensity distribution. The light distribution variable lamp 2 is enabled to vary, independently of each other, the illuminance of light illuminating a plurality of individual regions R arrayed ahead. The plurality of individual regions R are arrayed, for example, in a matrix. The light distribution variable lamp 2 receives information instructing on a light distribution pattern PTN from the light distribution controlling device 6 and emits a visible light beam L1 having an intensity distribution corresponding to the light distribution pattern PTN. Thus, the light distribution pattern PTN is formed ahead of the host vehicle. A light distribution pattern PTN is understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Although there is no particular limitation on the light sources, some preferred examples of such a light source include a semiconductor light source, such as a light-emitting diode (LED), a laser diode (LD), and an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the region ahead of the host vehicle with light from the light sources.

The first imaging device 4 has a sensitivity to a visible light range and repeatedly captures an image of the region ahead of the host vehicle. The first imaging device 4 captures an image of reflected light of a visible light beam L1 reflected by an object ahead of the vehicle. The first imaging device 4 also captures an image of light from a front vehicle, which includes a leading vehicle and an oncoming vehicle. An image IMG1 that the first imaging device 4 generates is sent to the light distribution controlling device 6. The imaging range of the first imaging device 4 matches the light illumination range of the light distribution variable lamp 2. Therefore, the outer edge of an image IMG1 and the outer edge of the range in which a light distribution pattern PTN can be formed overlap each other.

An image IMG1 that the light distribution controlling device 6 acquires from the first imaging device 4 may be RAW image data or image data subjected to predetermined image processing by the first imaging device 4. When the light distribution controlling device 6 receives image data resulting from subjecting RAW image data generated by the first imaging device 4 to image processing performed by a processing device other than the first imaging device 4, this receiving also corresponds to the acquiring of an image IMG1 from the first imaging device 4. In the following description, "an image IMG1 that is based on a first imaging device 4" may mean either of RAW image data and data subjected to image processing. Furthermore, the term "image IMG1" may be used without any distinction between the two types of image data.

The light distribution controlling device 6 executes ADB control of dynamically and adaptively controlling the light distribution of the light distribution variable lamp 2 in accordance with a target present in the region ahead. The light distribution controlling device 6 determines a light distribution pattern PTN that includes a shaded portion to overlap a front vehicle, with the use of an image IMG1 that is based on the first imaging device 4. The light distribution controlling device 6 then sends information instructing on the determined light distribution pattern PTN to the light distribution variable lamp 2. The light distribution controlling device 6 can be constituted by a digital processor and may, for example, be constituted by a combination of a microcomputer including a CPU and a software program or by a field-programmable gate array (FPGA), an application specific IC (ASIC), or the like. The light distribution controlling device 6 includes, in one example, an image processing unit 8, a region setting unit 10, a pattern determining unit 12, and a lamp controlling unit 14. Each of these units operates as the integrated circuit constituting itself executes a program stored in a memory.

Figure 2A:
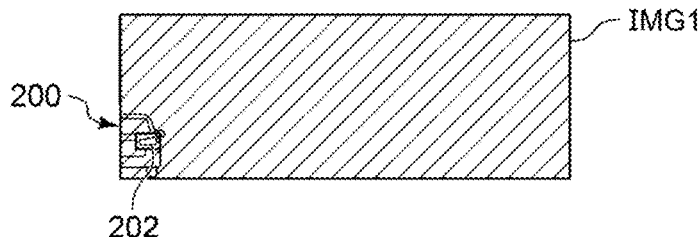
FIGS. 2A to 2D are illustrations for describing an operation of a light distribution controlling device according to Embodiment 1.

FIGS. 2A to 2D, 3A to 3F, and 4A and 4B are illustrations for describing an operation of the light distribution controlling device 6 according to Embodiment 1. First, as shown in FIG. 2A, the image processing unit 8 acquires an image IMG1 that is based on the first imaging device 4. In one example, the image IMG1 captures, at its left corner, roughly the right half of a front vehicle 200 and one luminous point 202 derived from a right lamp of the front vehicle 200. A lamp of a front vehicle 200 is, for example, a rear lamp if the front vehicle 200 is a leading vehicle or is, for example, a headlamp if the front vehicle 200 is an oncoming vehicle. A rear lamp includes a stop lamp and a tail lamp. Although FIG. 2A shows an image IMG1 captured when a light distribution pattern PTN is not formed, an image IMG1 is not limited to this image IMG1.

Figure 2B:
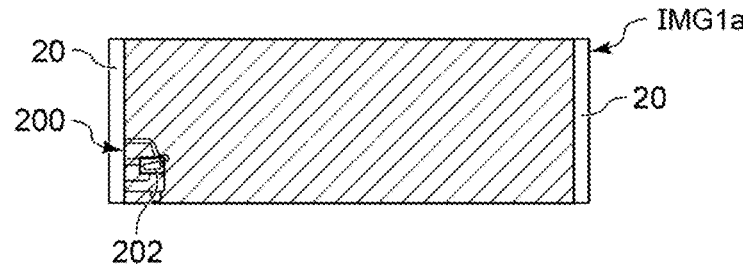

Upon acquiring the image IMG1, the image processing unit 8 generates a processed image IMG1*a* from the image IMG1, as shown in FIG. 2B. The processed image IMG1*a* is an image resulting from adding pixel lines 20 having a luminance value (pixel value) higher than a predetermined threshold to the ends of the image IMG1 in the width direction of the vehicle. In other words, the processed image IMG1*a* is edged with the pixel lines 20 at its right and left sides. Each of the pixel lines 20 is constituted, for example, by a line of pixels extending from the upper end to the lower end of the image IMG1. Herein, the width of a pixel line 20 is not limited to a single pixel. The threshold can be set in advance based on an experiment or simulation conducted by an engineer. The image processing unit 8 sends information about the processed image IMG1*a* to the region setting unit 10.

Figure 2C:
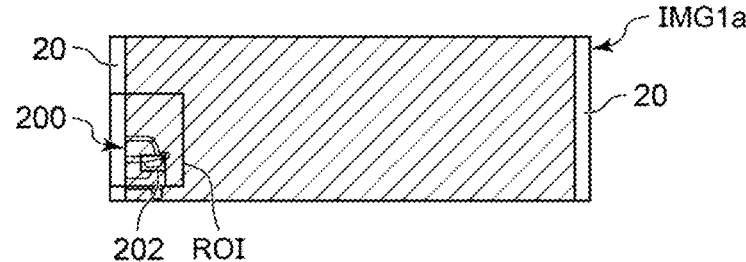

The region setting unit 10 sets a processing region ROI in the processed image IMG1*a*, as shown in FIG. 2C. The processing region ROI includes the range in which the front vehicle 200 is present. The region setting unit 10 according to the present embodiment acquires information about the processing region ROI from the outside. The information about the processing region ROI may include, for example, the position coordinates of the processing region ROI in the image IMG1 or the angle of the processing region ROI relative to the host vehicle. In one example, the region setting unit 10 acquires the information about the processing region ROI from the vehicle ECU 16 provided in the vehicle.

Figure 2D:
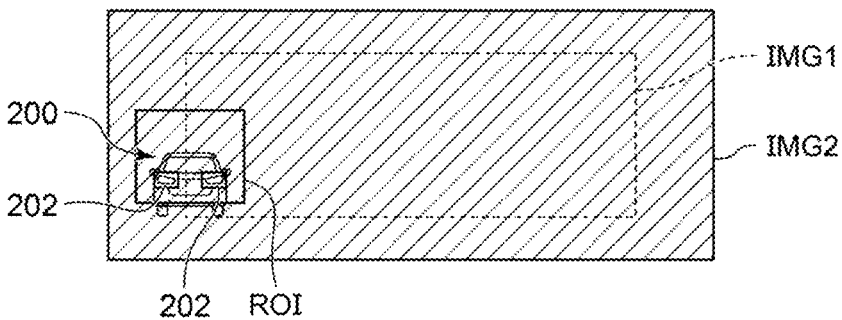

The vehicle ECU 16 generates the information about the processing region ROI, for example, as part of the control in the advanced driver-assistance system (ADAS). For example, as shown in FIG. 2D, the vehicle ECU 16 acquires a wide-angle image IMG2 that is based on a second imaging device 18. The second imaging device 18 has an imaging range broader than the light illumination range of the light distribution variable lamp 2. The vehicle ECU 16 then detects the front vehicle 200 from the wide-angle image IMG2 and generates position information of the front vehicle 200. The vehicle ECU 16 can detect the front vehicle 200 from the wide-angle image IMG2 with the use of a known technique, including algorithm recognition or deep learning.

The vehicle ECU 16 can determine that the luminous point 202 in the wide-angle image IMG2 has been derived from a lamp of the front vehicle 200, or in other words, can detect the front vehicle 200, based, for example, on the position or pairedness of the luminous point 202. Pairedness of a luminous point means that a plurality of luminous points show the same behaviors while maintaining their distance. The imaging range of the second imaging device 18 is broader than the light illumination range of the light distribution variable lamp 2 and than the imaging range of the first imaging device 4. This configuration provides a high likelihood that, even when the first imaging device 4 can capture only a part of the front vehicle 200, the second imaging device 18 can capture the entire front vehicle 200. Hence, the vehicle ECU 16 can detect the front vehicle 200 from the wide-angle image IMG2.

The vehicle ECU 16 then sets the processing region ROI based on the position information of the front vehicle 200 and sends information about the processing region ROI to the region setting unit 10. In one example, the processing region ROI is a region that includes the entire front vehicle 200 and a predetermined range surrounding the front vehicle 200. Herein, the region setting unit 10 may detect the front vehicle 200 from the wide-angle image IMG2 and generate information about the processing region ROI.

The region setting unit 10 sends the processed image IMG1*a* having the processing region ROI set therein to the image processing unit 8. The image processing unit 8 extracts the processing region ROI from the processed image IMG1*a*, as shown in FIG. 3A. The processed image IMG1*a* has been derived from the image IMG1 having an imaging range narrower than the imaging range of the wide-angle image IMG2. Therefore, the processing region ROI extracted from the processed image IMG1*a* includes only a part of the front vehicle 200. Hence, this processing region ROI includes only one luminous point 202 derived from the right lamp. The processing region ROI also includes the left pixel line 20.

The image processing unit 8 performs an extracting process of extracting a high-luminance pixel from the processing region ROI with the use of a threshold that is based on the luminance value of the pixel line 20. This extracting process includes known image processing, such as binarization. This process generates an extracted image IMG1*b* in which the luminous point 202 derived from the lamp of the front vehicle 200 and the pixel line 20 have been extracted, as shown in FIG. 3B. The image processing unit 8 sends the generated extracted image IMG1*b* to the pattern determining unit 12.

The pattern determining unit 12 sets a shaded portion 28 to overlap the front vehicle 200, based on high-luminance pixels included in the extracted image IMG1*b*. According to the present embodiment, the pattern determining unit 12 sets the shaded portion 28 based on a pair of high-luminance pixels arrayed in the width direction of the vehicle in the extracted image IMG1*b*. In one example, the pattern determining unit 12 performs a dilation process on the extracted image IMG1*b* to dilate high-luminance pixels in the upward direction and thus generates an upwardly dilated image IMG1*c* that includes an upwardly dilated group 21.

Specifically, with the use of a structuring element having a predetermined shape elongated in the up-down direction, the pattern determining unit 12 performs an upward dilation process on the extracted image IMG1*b* with the upper end pixel of the structuring element mapped to a pixel of interest. In the dilation process, when any of the pixels that the structuring element overlaps is a pixel of a high luminance value, the luminance value of the pixel of interest is changed to this high luminance value. Hence, in the upward dilation process, the luminance value of the pixels located above a high-luminance pixel in the extracted image IMG1*b* is changed to the luminance value of the high-luminance pixel. As a result, the upwardly dilated image IMG1*c* that includes the upwardly dilated group 21, as shown in FIG. 3C, is generated. The upwardly dilated group 21 includes a first upwardly dilated group 202*a* formed as the luminous point 202 is dilated in the upward direction, and a second upwardly dilated group 20*a* formed as the pixel line 20 is dilated in the upward direction. Herein, since the pixel line 20 extends from the upper end to the lower end in the extracted image IMG1*b*, the pixel line 20 and the second upwardly dilated group 20*a* have an identical shape.

The pattern determining unit 12 then performs a dilation process on the upwardly dilated image IMG1*c* to dilate the upwardly dilated group 21 in the left direction and thus generates a leftwardly dilated image IMG1*d* that includes a leftwardly dilated group 22. Specifically, with the use of a structuring element having a predetermined shape elongated in the right-left direction, the pattern determining unit 12 performs a leftward dilation process on the upwardly dilated image IMG1*c* with the left end pixel of the structuring element mapped to a pixel of interest. In the leftward dilation process, the luminance value of the pixels located to the left of a high-luminance pixel in the upwardly dilated image IMG1*c* is changed to the luminance value of the high-luminance pixel. As a result, the leftwardly dilated image IMG1*d* that includes the leftwardly dilated group 22, as shown in FIG. 3D, is generated. The leftwardly dilated group 22 has a shape in which a first leftwardly dilated group 202*b* formed as the first upwardly dilated group 202*a* is dilated in the left direction and a second leftwardly dilated group 20*b* formed as the second upwardly dilated group 20*a* is dilated in the left direction are joined together. Herein, since the second upwardly dilated group 20*a* is located at the left end of the upwardly dilated image IMG1*c*, the second upwardly dilated group 20*a* and the second leftwardly dilated group 20*b* have an identical shape.

The pattern determining unit 12 also performs a dilation process on the upwardly dilated image IMG1*c* to dilate the upwardly dilated group 21 in the right direction and thus generates a rightwardly dilated image IMG1*e* that includes a rightwardly dilated group 24. Specifically, with the use of a structuring element having a predetermined shape elongated in the right-left direction, the pattern determining unit 12 performs a rightward dilation process on the upwardly dilated image IMG1*c* with the right end pixel of the structuring element mapped to a pixel of interest. In the rightward dilation process, the luminance value of the pixels located to the right of a high-luminance pixel in the upwardly dilated image IMG1*c* is changed to the luminance value of the high-luminance pixel. As a result, the rightwardly dilated image IMG1*e* that includes the rightwardly dilated group 24, as shown in FIG. 3E, is generated. The rightwardly dilated group 24 has a shape in which a first rightwardly dilated group 202*c* formed as the first upwardly dilated group 202*a* is dilated in the right direction and a second rightwardly dilated group 20*c* formed as the second upwardly dilated group 20*a* is dilated in the right direction are joined together. Herein, the order of the rightward dilation process and the leftward dilation process is not set, and these processes can be performed in parallel.

The pattern determining unit 12 then combines the leftwardly dilated image IMG1*d* and the rightwardly dilated image IMG1*e*. In other words, the pattern determining unit 12 performs an AND operation on the leftwardly dilated image IMG1*d* and the rightwardly dilated image IMG1*e*. This operation generates a combined image IMG1*f* that includes a combined pixel group 26, as shown in FIG. 3F.

The combined pixel group 26 corresponds to a pixel region where the leftwardly dilated group 22 and the rightwardly dilated group 24 overlap.

Figure 4A:
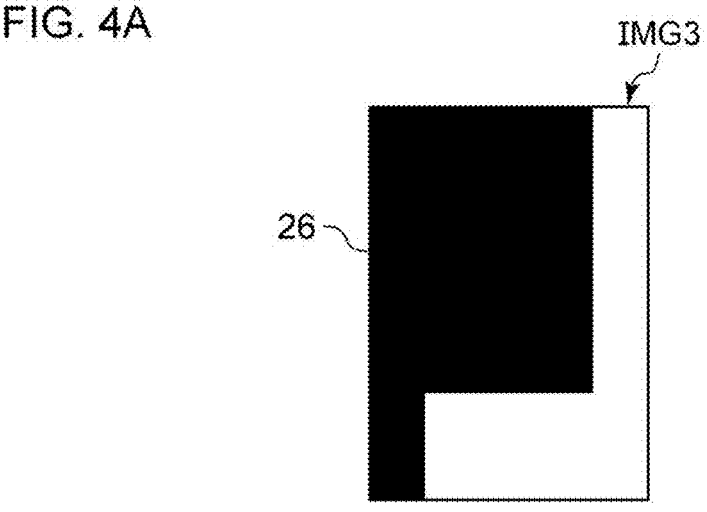
FIGS. 4A and 4B are illustrations for describing an operation of a light distribution controlling device according to Embodiment 1.
Figure 4B:
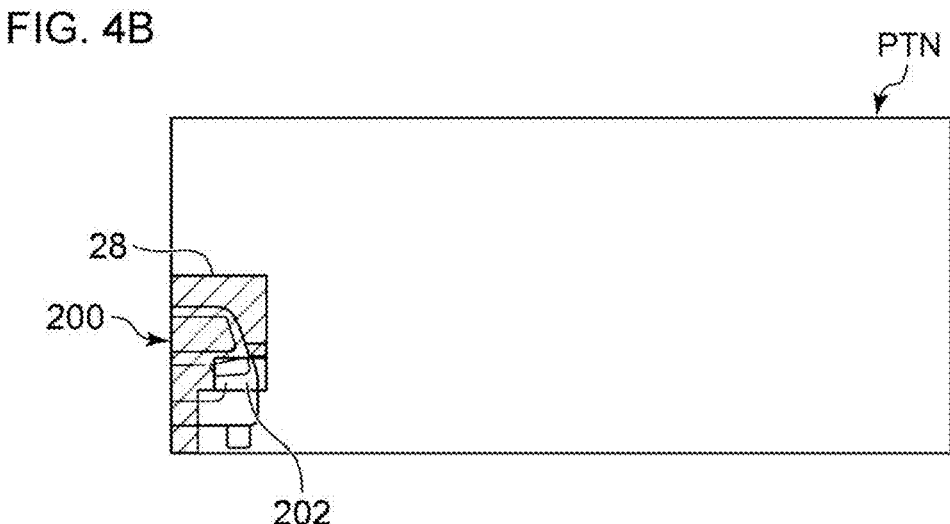

The pattern determining unit 12 sets the shaded portion 28 based on this combined pixel group 26. For example, the pattern determining unit 12 inverts the luminance value of each of the pixels in the combined image IMG1*f* and thus generates an inverted image IMG3 shown in FIG. 4A. In the inverted image IMG3, the combined pixel group 26 has a low luminance value, and the region other than the combined pixel group 26 has a high luminance value. The pattern determining unit 12 embeds the inverted image IMG3 into the region corresponding to the processing region ROI in the light distribution pattern serving as the base. The pattern determining unit 12 then sets, as the shaded portion 28, the combined pixel group 26 itself in the light distribution pattern that serves as the base. Thus, the light distribution pattern PTN that includes the shaded portion 28 to overlap the front vehicle 200 is determined, as shown in FIG. 4B. The pattern determining unit 12 sends information about the determined light distribution pattern PTN to the lamp controlling unit 14.

The shaded portion 28 is a portion of the light distribution pattern PTN of which the luminance (illuminance) is zero or a portion of the light distribution pattern PTN of which the luminance (illuminance) has been reduced to lower than the illuminance held before the shading but higher than zero. A light distribution pattern to serve as the base is selected in accordance with the light distribution mode that is determined based, for example, on the driver's instruction input by operating the light switch (not shown), the traveling state of the host vehicle, or the environment surrounding the host vehicle. The light distribution mode include, for example, a high beam mode of forming a high beam light distribution pattern and a low beam mode of forming a low beam light distribution pattern. As one example, FIG. 4B shows a high beam light distribution pattern.

The lamp controlling unit 14 instructs the light distribution variable lamp 2 to form the light distribution pattern PTN. The lamp controlling unit 14 is constituted, for example, by a known LED driver module (LDM). If the light sources of the light distribution variable lamp 2 are controlled through analog dimming, the lamp controlling unit 14 adjusts the direct current level of the driving current flowing in the light sources. Meanwhile, if the light sources are controlled through pulse width modulation (PWM) dimming, the lamp control unit 14 adjusts the mean level of the driving current by switching the current that flows in the light sources and adjusting the ratio of the on periods. If the light distribution variable lamp 2 includes a DMD, the lamp controlling unit 14 may control the on/off switching of each of the mirror elements constituting the DMD. If the light distribution variable lamp 2 includes a liquid-crystal device, the lamp control unit 14 may control the optical transmittance of the liquid-crystal device. Thus, the light distribution pattern PTN is formed ahead of the host vehicle.

As described above, the light distribution controlling device 6 according to the present embodiment generates a processed image IMG1*a* by adding pixel lines 20 of a high luminance to the ends, in the width direction of the vehicle, of an image IMG1 that is based on the first imaging device 4; extracts a processing region ROI from the processed image IMG1*a*; generates an extracted image IMG1*b* by subjecting the processing region ROI to an extracting process of extracting a high-luminance pixel; and sets a shaded portion 28 based on high-luminance pixels in the extracted image IMG1*b*.

When a front vehicle 200 is located at an end of the imaging range of the first imaging device 4 and one of the lamps is outside the imaging range of the first imaging device 4, a shaded portion 28 is set based only on a luminous point 202 derived from the other lamp. This case does not allow for the formation of a valid shaded portion 28 that extends over the pair of lamps and can cause glare on the driver of the front vehicle 200. Broadening the imaging range of the first imaging device 4 can reduce the likelihood that one of the lamps of the front vehicle 200 goes outside the imaging range. This case, however, may necessitate a broader-angle first imaging device 4. Furthermore, the above case can lead to an increase in the processing load of the light distribution controlling device 6 or an increase in necessary memory.

In contrast, according to the present embodiment, pixel lines 20 of a high luminance are added to the right and left ends of an image IMG1. The pixel lines 20 can be used as a substitute for a luminous point 202 derived from a lamp. Thus, the above configuration can guarantee that a luminous point 202 is present at the right or left end of an image IMG1. Therefore, even when one of the lamps of a front vehicle 200 goes off to the right or left of the imaging range of the first imaging device 4, a shaded portion 28 valid for this front vehicle 200 can be formed. Hence, reliability in forming a shaded portion can be increased.

According to the present embodiment, the imaging range of the first imaging device 4 matches the light illumination range of the light distribution variable lamp 2. Meanwhile, a processing region ROI is set based on a wide-angle image IMG2 broader than the light illumination range of the light distribution variable lamp 2. In the process of determining a shaded portion 28, an upwardly dilated image IMG1c is generated from an extracted image IMG1b, a leftwardly dilated image IMG1d and a rightwardly dilated image IMG1e are generated from the upwardly dilated image IMG1c, and the shaded portion 28 is set based on the leftwardly dilated image IMG1d and the rightwardly dilated image IMG1e. In this case, adding a pixel line 20 to an image IMG1 is particularly effective.

Embodiment 2

The present embodiment has a configuration identical to the configuration of Embodiment 1 except for part of the content of light distribution control. The present embodiment will be described below with the description centered on its configuration that differs from the configuration of Embodiment 1, and the description of configuration that is common to both embodiments will be omitted, as appropriate. FIGS. 5A to 5D, 6A to 6F, and 7A and 7B are illustrations for describing an operation of the light distribution controlling device 6 according to Embodiment 2.

Figure 5A:
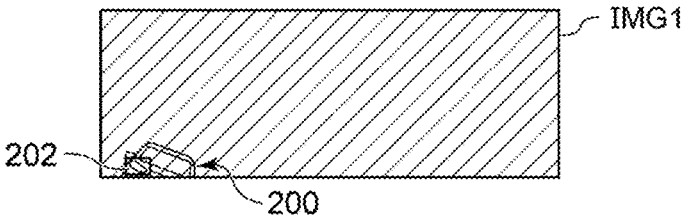
FIGS. 5A to 5D are illustrations for describing an operation of a light distribution controlling device according to Embodiment 2.

First, as shown in FIG. 5A, the image processing unit 8 acquires an image IMG1 that is based on the first imaging device 4. In one example, the image IMG1 captures, at its left corner, roughly the upper half of a front vehicle 200 that has tilted to the right and one luminous point 202 derived from a left lamp of the front vehicle 200. This kind of image IMG1 may be generated when the first imaging device 4 captures an image while the right-left axis of the host vehicle is tilted to a great extent, that is, while the host vehicle is tilted to a great extent in the roll direction. In particular, a straddle-type vehicle banks right and left to a great extent when traveling on a curved road, for example. Therefore, the kind of image IMG1 described above is more likely to be generated when the first imaging device 4 is provided in a straddle-type vehicle. Although FIG. 5A shows an image IMG1 captured when a light distribution pattern PTN is not formed, an image IMG1 is not limited to this image IMG1.

Figure 5B:
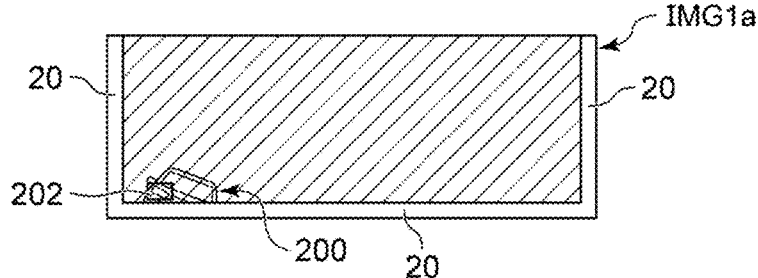

Upon acquiring the image IMG1, the image processing unit 8 generates a processed image IMG1a from the image IMG1, as shown in FIG. 5B. The image processing unit 8 according to the present embodiment generates the processed image IMG1a by adding pixel lines 20 to the ends of the image IMG1 in the width direction of the vehicle and also to the lower end of the image IMG1. Therefore, the processed image IMG1a is edged with the pixel lines 20 at its right, left, and lower sides. The image processing unit 8 sends information about the processed image IMG1a to the region setting unit 10.

Figure 5C:
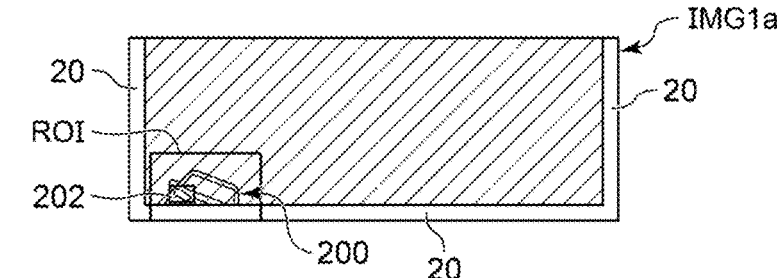
Figure 5D:
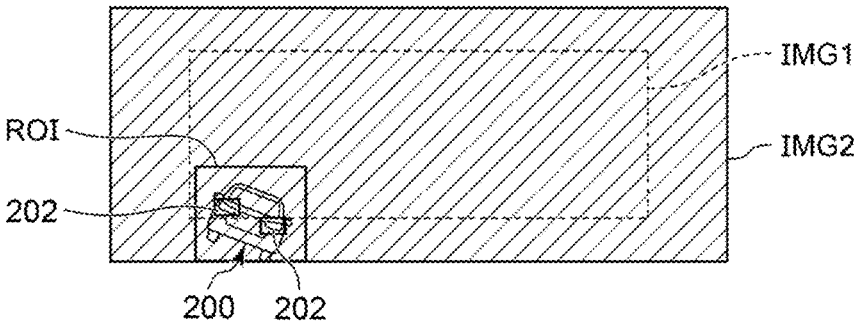

The region setting unit 10 sets a processing region ROI in the processed image IMG1a, as shown in FIG. 5C. The region setting unit 10 according to the present embodiment acquires information about the processing region ROI, for example, from the vehicle ECU 16. The vehicle ECU 16 detects the front vehicle 200 from a wide-angle image IMG2 broader than the light illumination range of the light distribution variable lamp 2, as shown in FIG. 5D. The vehicle ECU 16 then sets the processing region ROI based on the position information of the front vehicle 200 and sends information about the processing region ROI to the region setting unit 10.

Figures 6A, 6B, 6C, 6D, 6E, 6F:
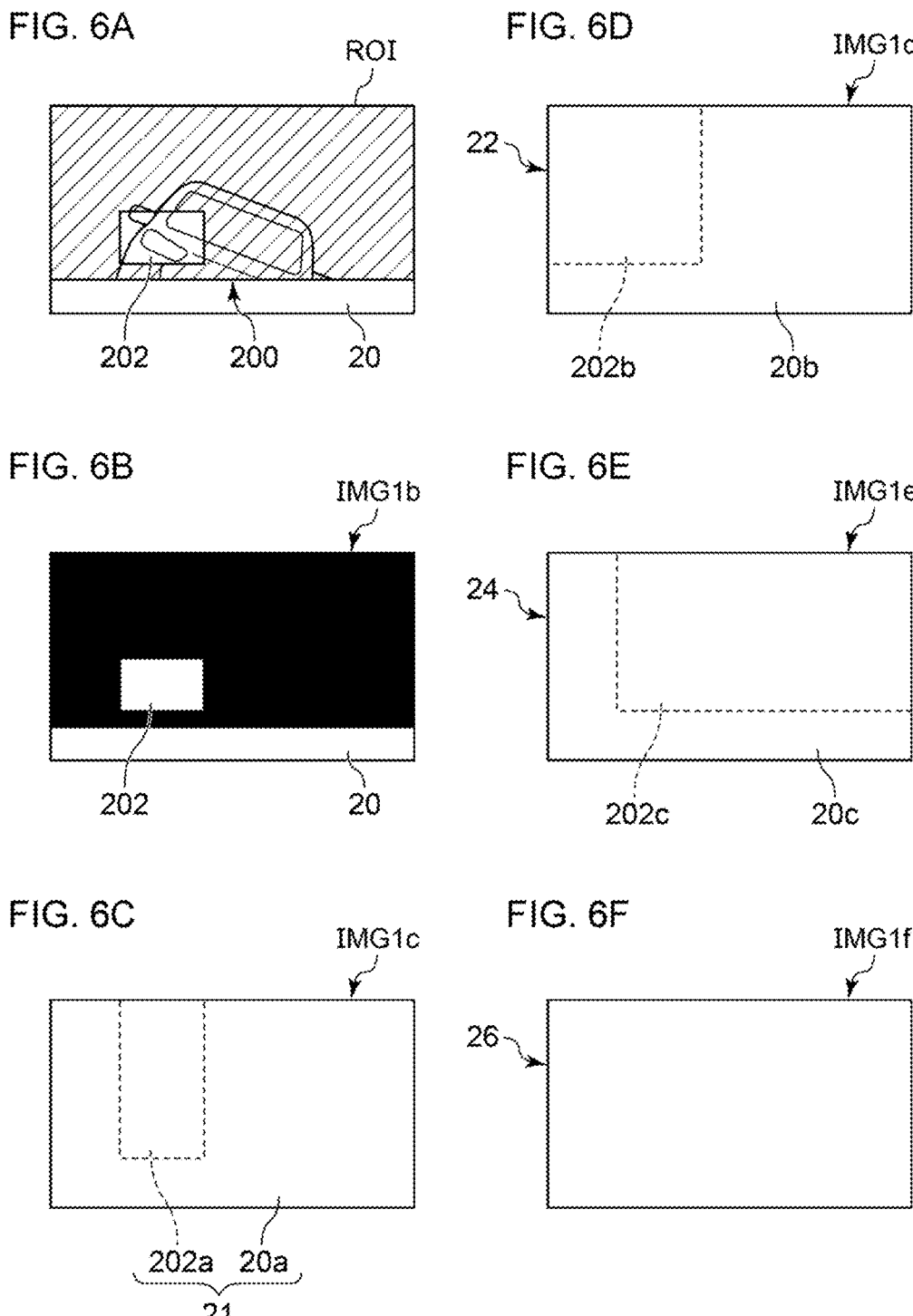
FIGS. 6A to 6F are illustrations for describing an operation of a light distribution controlling device according to Embodiment 2.

The region setting unit 10 sends the processed image IMG1a having the processing region ROI set therein to the image processing unit 8. The image processing unit 8 extracts the processing region ROI from the processed image IMG1a, as shown in FIG. 6A. The processing region ROI includes the one luminous point 202 derived from the left lamp and the pixel line 20 at the lower side. The image processing unit 8 performs an extracting process of extracting a high-luminance pixel from the processing region ROI with the use of a threshold that is based on the luminance value of the pixel line 20. This process generates an extracted image IMG1b in which the luminous point 202 derived from the lamp of the front vehicle 200 and the pixel line 20 have been extracted, as shown in FIG. 6B. The image processing unit 8 sends the generated extracted image IMG1b to the pattern determining unit 12.

The pattern determining unit 12 sets a shaded portion 28 to overlap the front vehicle 200, based on high-luminance pixels included in the extracted image IMG1b. According to the present embodiment, the pattern determining unit 12 sets the shaded portion 28 based on a pair of high-luminance pixels arrayed in the up-down direction in the extracted image IMG1b. In one example, the pattern determining unit 12 performs a dilation process on the extracted image IMG1b to dilate high-luminance pixels in the upward direction and thus generates an upwardly dilated image IMG1c that includes an upwardly dilated group 21, as shown in FIG. 6C. The upwardly dilated group 21 includes a first upwardly dilated group 202a formed as the luminous point 202 is dilated in the upward direction, and a second upwardly dilated group 20a formed as the pixel line 20 is dilated in the upward direction. Herein, the pixel line 20 extends between the left end and the right end of the extracted image IMG1b at its lower end. Therefore, the upwardly dilated image IMG1c is entirely covered with the second upwardly dilated group 20a.

The pattern determining unit 12 then performs a dilation process on the upwardly dilated image IMG1c to dilate the upwardly dilated group 21 in the left direction and thus generates a leftwardly dilated image IMG1d that includes a leftwardly dilated group 22, as shown in FIG. 6D. The leftwardly dilated group 22 has a shape in which a first leftwardly dilated group 202*b* formed as the first upwardly dilated group 202*a* is dilated in the left direction and a second leftwardly dilated group 20*b* formed as the second upwardly dilated group 20*a* is dilated in the left direction are joined together. Herein, since the upwardly dilated image IMG1*c* is entirely covered with the second upwardly dilated group 20*a*, the leftwardly dilated image IMG1*d* and the upwardly dilated image IMG1*c* are identical.

The pattern determining unit 12 also performs a dilation process on the upwardly dilated image IMG1*c* to dilate the upwardly dilated group 21 in the right direction and thus generates a rightwardly dilated image IMG1*e* that includes a rightwardly dilated group 24, as shown in FIG. 6E. The rightwardly dilated group 24 has a shape in which a first rightwardly dilated group 202*c* formed as the first upwardly dilated group 202*a* is dilated in the right direction and a second rightwardly dilated group 20*c* formed as the second upwardly dilated group 20*a* is dilated in the right direction are joined together. Herein, since the upwardly dilated image IMG1*c* is entirely covered with the second upwardly dilated group 20*a*, the rightwardly dilated image IMG1*e* and the upwardly dilated image IMG1*c* are identical. The order of the rightward dilation process and the leftward dilation process is not set, and these processes can be performed in parallel.

The pattern determining unit 12 then combines the leftwardly dilated image IMG1*d* and the rightwardly dilated image IMG1*e*. This operation generates a combined image IMG1*f* that includes a combined pixel group 26, as shown in FIG. 6F. The combined pixel group 26 corresponds to a pixel region where the leftwardly dilated group 22 and the rightwardly dilated group 24 overlap.

Figure 7A:
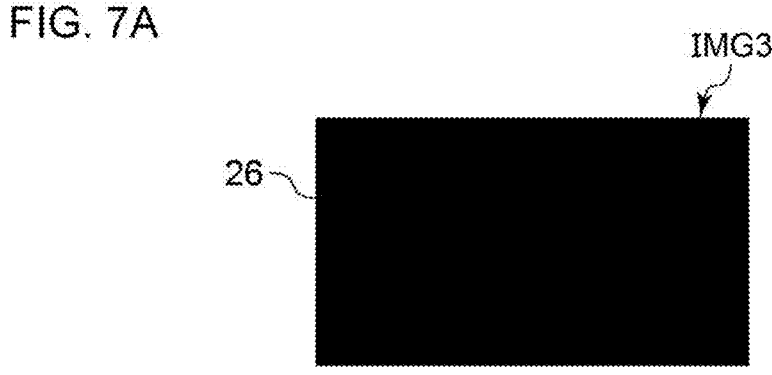
FIGS. 7A and 7B are illustrations for describing an operation of a light distribution controlling device according to Embodiment 2.
Figure 7B:
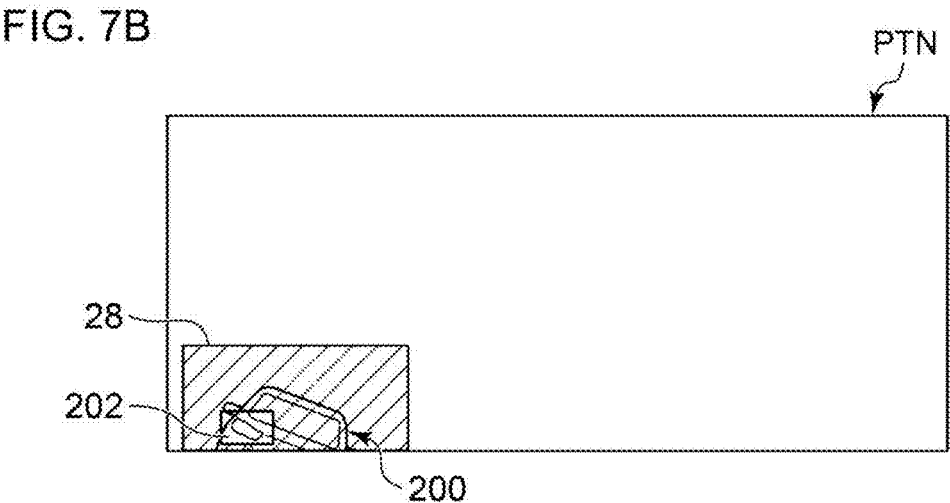

The pattern determining unit 12 sets the shaded portion 28 based on this combined pixel group 26. For example, the pattern determining unit 12 inverts the luminance value of each of the pixels in the combined image IMG1*f* and thus generates an inverted image IMG3 shown in FIG. 7A. The pattern determining unit 12 then embeds the inverted image IMG3 into the light distribution pattern serving as the base and sets the combined pixel group 26 itself as the shaded portion 28. Thus, the light distribution pattern PTN that includes the shaded portion 28 to overlap the front vehicle 200 is determined, as shown in FIG. 7B. The pattern determining unit 12 sends information about the determined light distribution pattern PTN to the lamp controlling unit 14.

As described above, the light distribution controlling device 6 according to the present embodiment generates a processed image IMG1*a* by adding pixel lines 20 to the ends, in the width direction of the vehicle, of an image IMG1 and to the lower end of the image IMG1; extracts a processing region ROI from the processed image IMG1*a*; generates an extracted image IMG1*b* from the processing region ROI; and sets a shaded portion 28 based on high-luminance pixels in the extracted image IMG1*b*. With this configuration, even when one of the lamps of a front vehicle 200 goes outside and below the imaging range of the first imaging device 4, a shaded portion 28 valid for this front vehicle 200 can be formed. Hence, reliability in forming a shaded portion can be increased.

Thus far, some embodiments according to the present invention have been described in detail. The embodiments described above merely illustrate some specific examples for implementing the present invention. The content of the embodiments does not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiments described above, the expressions "according to the present embodiment," "in the present embodiment," and so on are added for emphasis to the content that can be subjected to a design change as described above, but a design change is also permitted on the content without these expressions. A desired combination of the constituent elements described above is also valid as an aspect of the present invention. Hatching added along a section in the drawings does not limit the material of such with hatching.

The invention according to the embodiments described above may be identified by the items indicated below.

[First Item]

A light distribution controlling device (6) configured to:

generate a processed image (IMG1*a*) by adding a pixel line (20) of a luminance value higher than a predetermined threshold to an end, in a width direction of a vehicle, of an image (IMG1) that is based on a first imaging device (4) that captures an image of a region ahead of the vehicle;

extract, from the processed image (IMG1*a*), a processing region (ROI) that includes a front vehicle (200);

generate an extracted image (IMG1*b*) by subjecting the processing region (ROI) to an extracting process of extracting a high-luminance pixel (20, 202) with use of the threshold; and set a shaded portion (28) to overlap the front vehicle (200) based on a pair of high-luminance pixels (20, 202) included in the extracted image (IMG1*b*) and determine a light distribution pattern (PTN) that includes the shaded portion (28).

[Second Item]

The light distribution controlling device (6) according to First Item, wherein the light distribution controlling device (6) adds the pixel line (20) also to a lower end of the image (IMG1).

[Third Item]

The light distribution controlling device (6) according to First Item or Second Item, wherein the image (IMG1) is an image of an imaging range matching a light illumination range of a light distribution variable lamp (2) that forms the light distribution pattern (PTN), and the processing region (ROI) is set based on position information of the front vehicle (200) detected from a wide-angle image (IMG2) that is based on a second imaging device (18) having an imaging range broader than the light illumination range.

[Fourth Item]

The light distribution controlling device (6) according to any one of First Item to Third Item, wherein the light distribution controlling device (6)

generates an upwardly dilated image (IMG1*c*) that includes an upwardly dilated group (21) by subjecting the extracted image (IMG1*b*) to a dilation process of dilating the high-luminance pixel (20, 202) in an upward direction, generates a leftwardly dilated image (IMG1*d*) that includes a leftwardly dilated group (22) by subjecting the upwardly dilated image (IMG1*c*) to a dilation process of dilating the upwardly dilated group (21) in a left direction, generates a rightwardly dilated image (IMG1*e*) that includes a rightwardly dilated group (24) by subjecting the upwardly dilated image (IMG1*c*) to a dilation process of dilating the upwardly dilated group (21) in a right direction, and sets, as the shaded portion (28), a pixel region (26) where the leftwardly dilated group (22) and the rightwardly dilated group (24) overlap.

[Fifth Item]

The light distribution controlling device (6) according to Second Item, wherein the first imaging device (4) is provided in a straddle-type vehicle.

[Sixth Item]

A vehicle lamp system (1), comprising:

a light distribution variable lamp (2) capable of forming a light distribution pattern (PTN) that includes a shaded portion (28) to overlap a front vehicle (200);

a first imaging device (4) that captures an image of a region ahead of a vehicle; and the light distribution controlling device (6) according to any one of First Item to Fifth Item, the light distribution controlling device (6) controlling formation of the light distribution pattern (PTN) by the light distribution variable lamp (2).

[Seventh Item]

A light distribution controlling method, comprising:

generating a processed image (IMG1*a*) by adding a pixel line (20) of a luminance value higher than a predetermined threshold to an end, in a width direction of a vehicle, of an image (IMG1) that is based on a first imaging device (4) that captures an image of a region ahead of the vehicle;

extracting, from the processed image (IMG1*a*), a processing region (ROI) that includes a front vehicle (200);

generating an extracted image (IMG1*b*) by subjecting the processing region (ROI) to an extracting process of extracting a high-luminance pixel (20, 202) with use of the threshold; and setting a shaded portion (28) to overlap the front vehicle (200) based on a pair of high-luminance pixels (20, 202) included in the extracted image (IMG1*b*) and determining a light distribution pattern (PTN) that includes the shaded portion (28).

What is claimed is:

1. A light distribution controlling device configured to:

generate a processed image by adding a pixel line of a luminance value higher than a predetermined threshold to an end, in a width direction of a vehicle, of an image that is based on a first imaging device that captures an image of a region ahead of the vehicle;

extract, from the processed image, a processing region that includes a front vehicle;

generate an extracted image by subjecting the processing region to an extracting process of extracting a high-luminance pixel with use of the threshold; and set a shaded portion to overlap the front vehicle based on a pair of high-luminance pixels included in the extracted image and determine a light distribution pattern that includes the shaded portion.

2. The light distribution controlling device according to claim 1, wherein the light distribution controlling device adds the pixel line also to a lower end of the image.

3. The light distribution controlling device according to claim 2, wherein the image is an image of an imaging range matching a light illumination range of a light distribution variable lamp that forms the light distribution pattern, and the processing region is set based on position information of the front vehicle detected from a wide-angle image that is based on a second imaging device having an imaging range broader than the light illumination range.

4. The light distribution controlling device according to claim 3, wherein the light distribution controlling device generates an upwardly dilated image that includes an upwardly dilated group by subjecting the extracted image to a dilation process of dilating the high-luminance pixel in an upward direction, generates a leftwardly dilated image that includes a leftwardly dilated group by subjecting the upwardly dilated image to a dilation process of dilating the upwardly dilated group in a left direction, generates a rightwardly dilated image that includes a rightwardly dilated group by subjecting the upwardly dilated image to a dilation process of dilating the upwardly dilated group in a right direction, and sets, as the shaded portion, a pixel region where the leftwardly dilated group and the rightwardly dilated group overlap.

5. The light distribution controlling device according to claim 2, wherein the light distribution controlling device generates an upwardly dilated image that includes an upwardly dilated group by subjecting the extracted image to a dilation process of dilating the high-luminance pixel in an upward direction, generates a leftwardly dilated image that includes a leftwardly dilated group by subjecting the upwardly dilated image to a dilation process of dilating the upwardly dilated group in a left direction, generates a rightwardly dilated image that includes a rightwardly dilated group by subjecting the upwardly dilated image to a dilation process of dilating the upwardly dilated group in a right direction, and sets, as the shaded portion, a pixel region where the leftwardly dilated group and the rightwardly dilated group overlap.

6. The light distribution controlling device according to claim 2, wherein the first imaging device is provided in a straddle-type vehicle.

7. The light distribution controlling device according to claim 1, wherein the image is an image of an imaging range matching a light illumination range of a light distribution variable lamp that forms the light distribution pattern, and the processing region is set based on position information of the front vehicle detected from a wide-angle image that is based on a second imaging device having an imaging range broader than the light illumination range.

8. The light distribution controlling device according to claim 7, wherein the light distribution controlling device generates an upwardly dilated image that includes an upwardly dilated group by subjecting the extracted image to a dilation process of dilating the high-luminance pixel in an upward direction, generates a leftwardly dilated image that includes a leftwardly dilated group by subjecting the upwardly dilated image to a dilation process of dilating the upwardly dilated group in a left direction, generates a rightwardly dilated image that includes a rightwardly dilated group by subjecting the upwardly dilated image to a dilation process of dilating the upwardly dilated group in a right direction, and sets, as the shaded portion, a pixel region where the leftwardly dilated group and the rightwardly dilated group overlap.

9. The light distribution controlling device according to claim 1, wherein the light distribution controlling device generates an upwardly dilated image that includes an upwardly dilated group by subjecting the extracted image to a dilation process of dilating the high-luminance pixel in an upward direction, generates a leftwardly dilated image that includes a leftwardly dilated group by subjecting the upwardly dilated image to a dilation process of dilating the upwardly dilated group in a left direction, generates a rightwardly dilated image that includes a rightwardly dilated group by subjecting the upwardly dilated image to a dilation process of dilating the upwardly dilated group in a right direction, and sets, as the shaded portion, a pixel region where the leftwardly dilated group and the rightwardly dilated group overlap.

10. A vehicle lamp system, comprising:

a light distribution variable lamp capable of forming a light distribution pattern that includes a shaded portion to overlap a front vehicle;

a first imaging device that captures an image of a region ahead of a vehicle; and the light distribution controlling device according to claim 1, the light distribution controlling device controlling formation of the light distribution pattern by the light distribution variable lamp.

11. A light distribution controlling method, comprising:

generating a processed image by adding a pixel line of a luminance value higher than a predetermined threshold to an end, in a width direction of a vehicle, of an image that is based on a first imaging device that captures an image of a region ahead of the vehicle;

extracting, from the processed image, a processing region that includes a front vehicle;

generating an extracted image by subjecting the processing region to an extracting process of extracting a high-luminance pixel with use of the threshold; and setting a shaded portion to overlap the front vehicle based on a pair of high-luminance pixels included in the extracted image and determining a light distribution pattern that includes the shaded portion.

* * * * *